(12) United States Patent
Roussel

(10) Patent No.: US 6,357,468 B1
(45) Date of Patent: Mar. 19, 2002

(54) UNIVERSAL VALVE

(75) Inventor: Jean Roussel, Saint-Julien-en-Genevois (FR)

(73) Assignee: Sporting S.A. (CH)

( * ) Notice: Subject to any disclaimer, the term of this patent is extended or adjusted under 35 U.S.C. 154(b) by 0 days.

(21) Appl. No.: 09/581,009

(22) PCT Filed: Dec. 9, 1998

(86) PCT No.: PCT/IB98/01958

§ 371 Date: Sep. 6, 2000

§ 102(e) Date: Sep. 6, 2000

(87) PCT Pub. No.: WO99/30066

PCT Pub. Date: Jun. 17, 1999

(30) Foreign Application Priority Data

Dec. 9, 1997 (CH) ................................. 2839/97

(51) Int. Cl.[7] ...................... F16K 15/14; F16K 15/20
(52) U.S. Cl. .................. 137/223; 137/859; 220/203.11
(58) Field of Search ..................... 137/223, 225, 137/843, 849, 852, 859, 903; 220/203.11; 383/3, 103; 473/611

(56) References Cited

U.S. PATENT DOCUMENTS 2,942,614 A * 6/1960 Lardner ....................... 137/223
3,385,301 A * 5/1968 Harautuneian .............. 137/223

FOREIGN PATENT DOCUMENTS

| DE | 387 190 C | 8/1922 |
| DE | 490 336 C | 10/1928 |
| DE | 2062 116 | 8/1972 |
| EP | 0 080 628 A | 6/1983 |
| EP | 0 253 748 A | 1/1988 |

* cited by examiner

*Primary Examiner*—Michael Powell Buiz
*Assistant Examiner*—Ramesh Krishnamurthy
(74) *Attorney, Agent, or Firm*—Cantor Colburn LLP

(57) ABSTRACT

The valve, which is intended to regulate the passage of a fluid through an office [(O)] in a wall [(P)], comprises a tubular body [(10)] and a flexible rubber cover [(11)] which deforms under the action of the pressures [($P_1$ and $P_2$)] prevailing in the spaces on each side of the valve.

7 Claims, 3 Drawing Sheets

1

UNIVERSAL VALVE

TECHNICAL FIELD

The present invention relates to a universal valve allowing regulation of the flow of a fluid, liquid or gas, e.g. air, water, oil, blood, etc., through an orifice in a rigid, semi-rigid, flexible etc. wall delimiting spaces in which there prevail respectively pressures $P_1$, $P_2$, the valve having a tubular body intended to be fixed in a sealed manner facing the orifice on one side of the wall, and a deformable flexible member subject to the action of the pressures $P_1$ and $P_2$ controlling the flow of the fluid as a function of these pressures.

BACKGROUND OF THE INVENTION

The document DE 387 190 relates to a valve for a sealed envelope of a ball, comprising a conical tubular body fixed to the internal wall of the envelope, on the inside of which is mounted a seal having a conical concave part, within which there engages a likewise conical central part. The conical concave part has holes which are sealed by the conical tubular body and by the conical central part of the seal when the pressure inside the envelope is greater than the external pressure.

The document EP-A-0 253 748 relates to a one-piece valve, the thickness of which matches that of the wall of an enclosed space to be isolated, the said valve having an internal cavity which communicates with the exterior via a first hole and communicates with the interior of the enclosed space via a plurality of holes arranged between the wall of the enclosed space itself and a part of the latter forming a valve element, these holes being closed when the pressure inside the enclosed space is greater than the external pressure.

The document DE-A-2 062 116 relates to a nonreturn valve for a pneumatic control valve comprising a body into which there open an inlet for fluid under pressure, an outlet towards a consuming unit and a vent. A valve element is mounted so as to slide in the control valve to allow either the consuming unit to be fed from the pressure source, with the vent being closed, or to vent the consuming unit, with the inlet for fluid under pressure being closed.

SUMMARY OF THE INVENTION

The valve according to the invention is defined by the characteristic given in claim 1.

Its principal quality is that it has very low inertia while at the same time being highly reliable.

It is universal in the sense that it has applications and uses in various sectors, e.g. in pneumatic objects and devices (boats, balls, mattresses, buoys, etc.), in medicine and surgery (artificial hearts), in aeronautics, in sporting equipment (diving etc.). In principle, there are no particular problems in miniaturizing it.

Other characteristics of the invention will emerge from the subclaims.

BRIEF DESCRIPTION OF THE DRAWINGS

The attached drawing illustrates, schematically and by way of nonlimitative example, two embodiments of the subject matter of the invention in the case of its application to a valve integrated into the envelope of a pneumatic device.

DETAILED DESCRIPTION OF THE INVENTION

Figure 1:
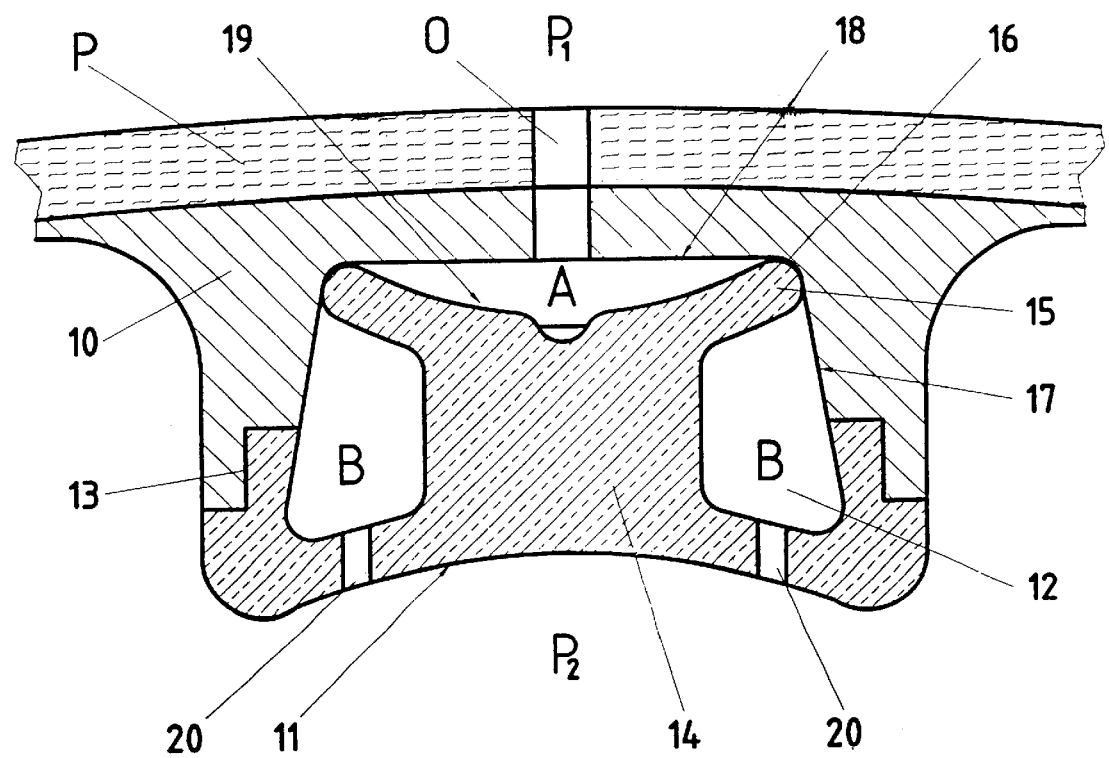
FIGS. 1 to 3 are three sectional views of the valve and the part of the envelope on which it is mounted, when the internal and external pressures are equal, when the external pressure is greater than the internal pressure and when the internal pressure is greater than the external pressure respectively.

The valve illustrated in FIGS. 1 to 4 is described as an integral part of the flexible envelope of a ball used in sport (football, basketball, etc.) or a pneumatic tyre for a vehicle (motor vehicle, aeroplane etc.) with or without an air chamber, the inflation pressure in this equipment being of great importance.

This valve is formed by a rigid, semi-rigid or flexible tubular body 10 bonded to the internal surface of an envelope P coaxially to the inflation orifice O, and by a cover 11 made of flexible rubber housed in a frustoconical cavity 12 of the body 10 and bonded to the latter at the level of circular bearing surfaces 13 arranged at the edge of a dished part situated at one end of the core 14 of the cover 11. The other end of the core is provided with a dished part 15.

In the case shown in FIG. 1, the pressures $P_1$ and $P_2$ are equal to atmospheric pressure ($P_1 = P_2 = P_{at}$) and the circular edge 16 of the dish 15 is pressed against the circular surface of the fillet connecting the frustoconical wall 17 and the upper surface 18 of the cavity 12.

The body 10 and the cover 11 delimit two zones A and B, zone A communicating directly with the orifice O and zone B being connected by holes 20 to the interior of the envelope P. The air cannot circulate in either direction.

When $P_1 > P_2$ (FIG. 2, inflation of the ball), the air drawn in through the orifice O exerts an effect on the dish 15 which brings about elastic deformation of the cover 11 and opens a circular passage f between the edge 16 and the wall 17. The air can flow from the outside to the inside of the ball and inflate it.

When $P_2 > P_1$, (FIG. 3), the cover 11 is subject to an upward action which deforms it elastically, pressing the surface 19 of the dish 15 against the surface 18 and closing the passage f.

Figure 2:
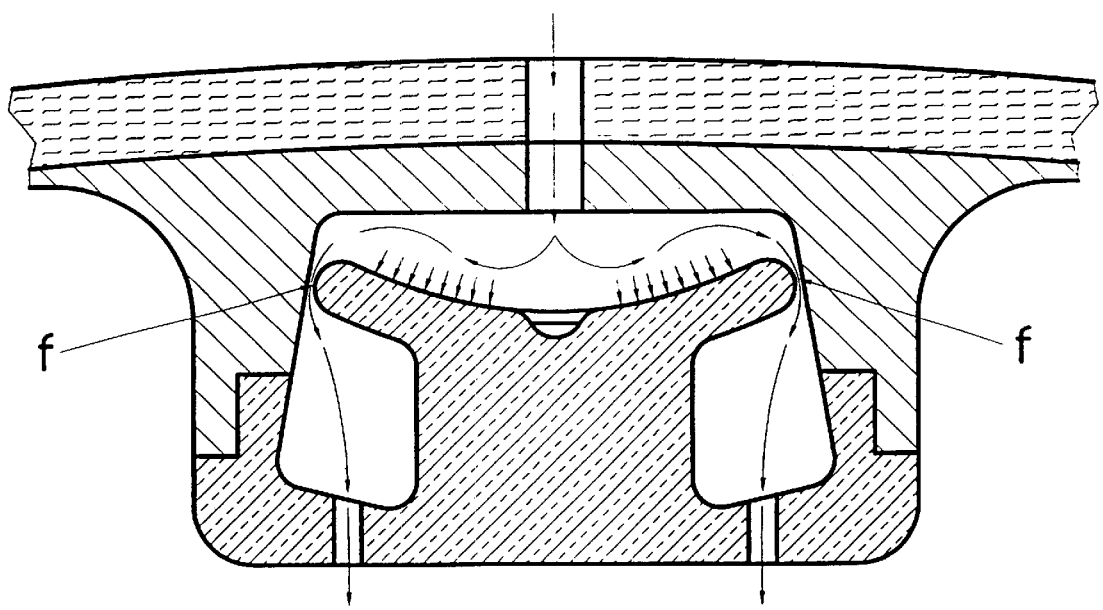
Figure 3:
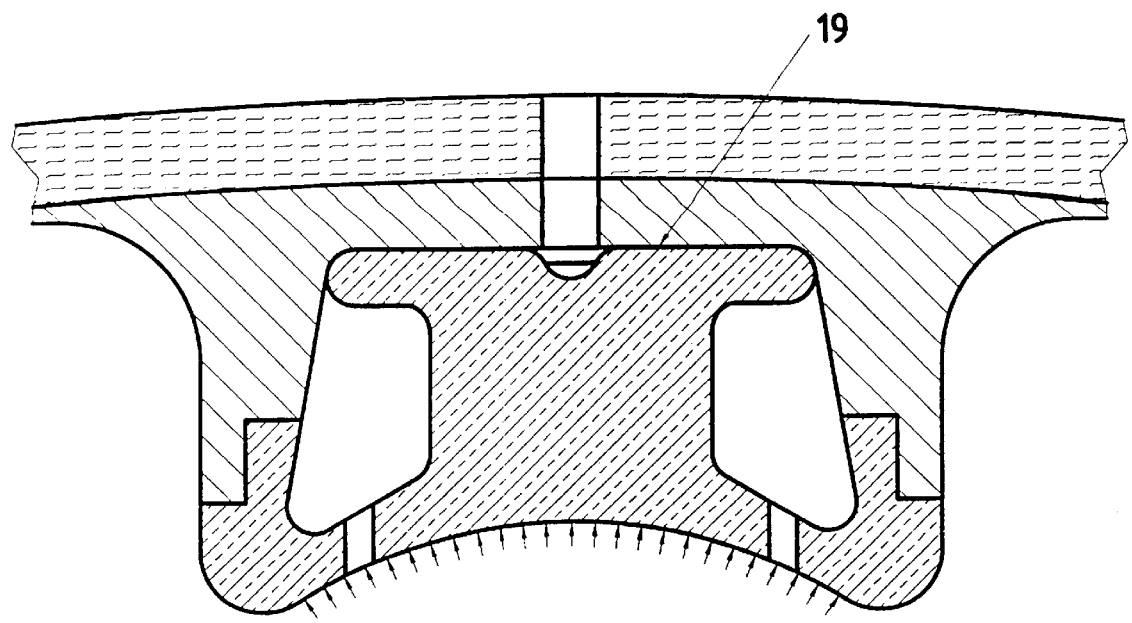
Figure 4:
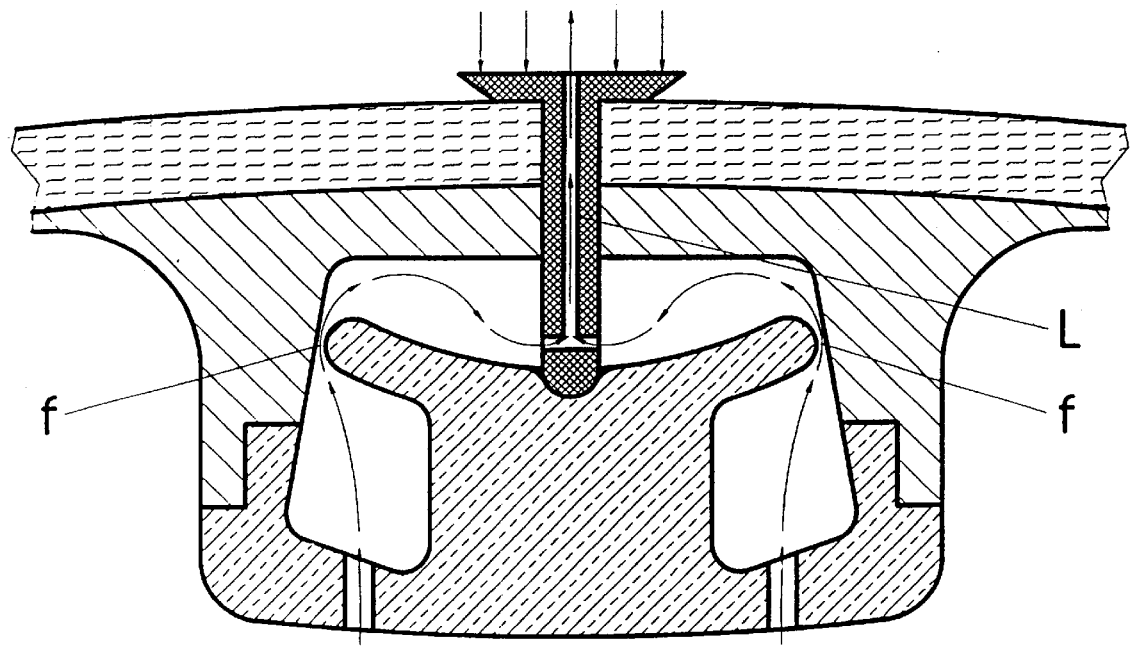
FIG. 4 is a view similar to those in FIGS. 1 to 3 illustrating mechanical control of the outflow of air through the valve.

It will be observed that during the deformations of the cover 11 illustrated in FIGS. 1 to 3, the edge 16 of the dish 15 is displaced in the axial direction. When it proves necessary to reduce the pressure $P_2$ in the case where $P_2 > P_1$, some of the air trapped in the ball can be allowed to escape to the outside by introducing a pin L into the orifice O and exerting a mechanical action on the surface 19. The balloon continues to deflate for as long as this action is maintained. It will be stopped when the pressure $P_2$ has reached the desired value.

Figure 5:
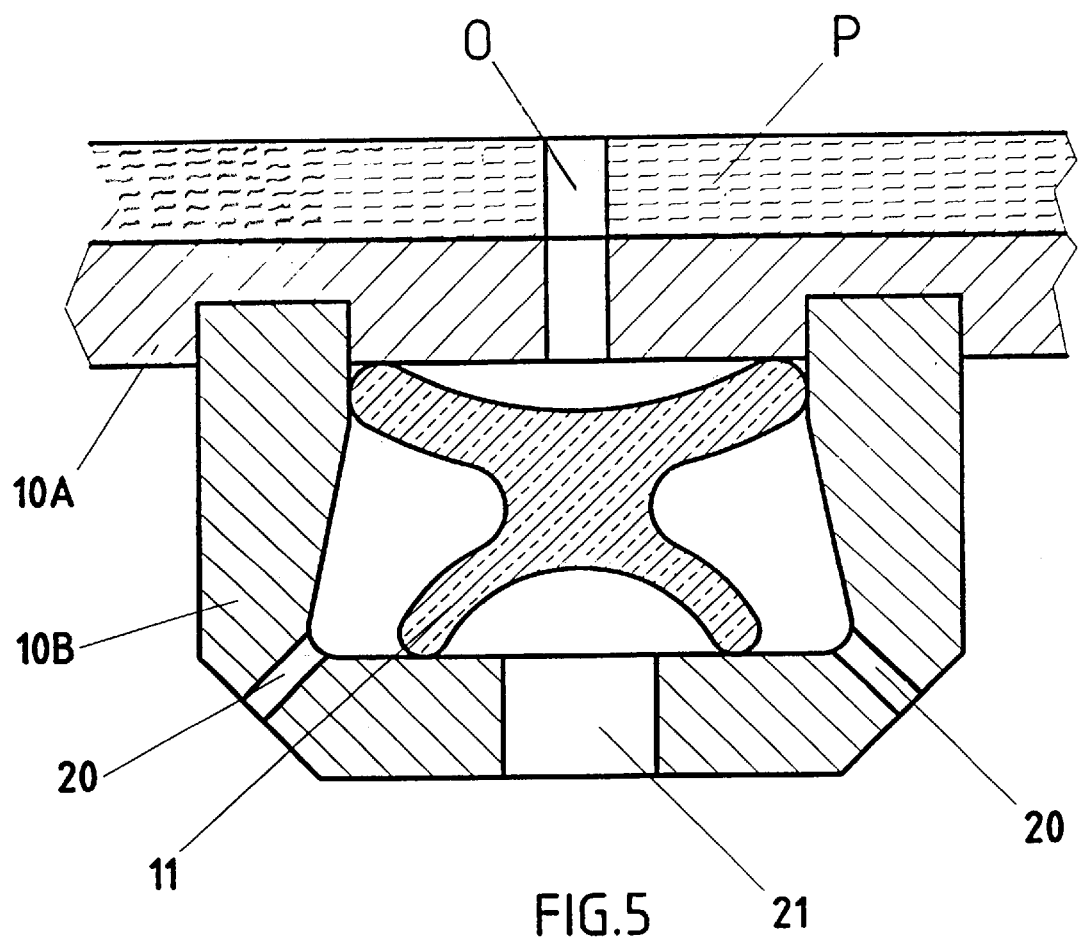
FIG. 5 is a sectional view of a variant embodiment of the valve in FIGS. 1 to 4.

In the variant in FIG. 5, in which the valve is in three pieces, the cover 11 has the shape of a diabolo, having a dish intended to be supported against the base 10A of the tubular body 10B and a second dish intended to be supported against the closing wall of the tubular body. This closing wall has, on the one hand, holes 20 for connecting the annular cavity delimited by the frustoconical wall of the tubular body 10B and the core of the cover 11 to the space at the pressure $P_2$ and, on the other hand, a hole 21 for connecting the space within the second dish to the space at the pressure $P_2$.

By appropriate choice of the material and the dimensions of the cover 11, it is possible to construct a valve which, apart from being extremely reliable, will have a very sensitive response combined with very low inertia.

It is possible to inflate pneumatic objects and devices with relatively low-pressure pumps or even by mouth. The invention is obviously not limited by the above text and the attached drawing.

In particular, the cover 11 may take forms very different from those shown while remaining within the scope of the claims, the essential element being that it deforms elastically under the action of the pressures $P_1$ and $P_2$ in such a way as to open or close a passage f between the spaces 1 and 2 on each side of the valve.

Moreover, the valve according to the invention can easily be miniaturized.

Finally, provision can be made to give the frustoconical wall 17 a special profile such that, as it is displaced axially towards the inside, the edge 16 of the cover 11 exposes passages of relatively large section so as to rapidly increase the air flow rate. In particular, the wall 17 can have grooves from a certain level onwards.

What is claimed is:

1. A universal valve allowing regulation of a passage of a fluid through an orifice in a wall delimiting spaces in which pressures $P_1$ and $P_2$ prevail, comprising:

a tubular body fixable in a sealed manner on a face of the wall including an internal recess having a frustoconical shape a cross section of which is smaller proximate the wall and larger distal the wall;

a deformable flexible member housed in the tubular body for allowing or preventing the passage of fluid, the flexible member including a cover having a core aligned along an axis of the orifice, the core having a cross section less than that of the internal recess of the tubular body the core having, proximate the wall, a first dish portion the diameter of which is substantially equal to a diameter of a base of the tubular body, the other end of the core including a second dish portion connected to a skirt of the tubular body; and an annular cavity formed between the core of the cover and a frustoconical wall of the tubular body, the cavity being in constant communication with the space in which the pressure $P_2$ prevails;

wherein $P_1$ is the pressure on a side of the wall opposite the universal valve and $P_2$ is the pressure on the side of the wall where the universal valve is disposed;

wherein the first dish is supported against the base of the body preventing passage of the fluid when the pressures $P_1$ and $P_2$ are equal and when the pressure $P_2$ is greater than the pressure $P_1$; and wherein the cover is deformed and the passage of fluid is allowed between an edge of the first dish and the frustoconical wall of the tubular body when the pressure $P_1$ is greater than the pressure $P_2$.

2. The valve according to claim 1, wherein the first dish portion has a concave profile at a face directed towards the orifice of the wall.

3. The valve according to claim 1 wherein the second dish portion has a concave profile.

4. The valve according to claim 1, wherein the frustoconical wall of the tubular body includes grooves which increase a cross section of passage of the fluid.

5. The valve according to claim 1, wherein the core includes a second annular skirt situated on the opposite side of the core from the first dish and proximate to the second dish including a circular bearing surface fixed on a complementary circular bearing surface on the frustoconical wall of the tubular body, the annular skirt having holes for the communication between the annular cavity and the space in which the pressure $P_2$ prevails.

6. A valve according to claim 1, wherein when viewed in section in a longitudinal plane, the cover has the shape of a diabolo and wherein the tubular body includes a closing wall parallel to the base to support the second dish and includes holes for said communicating the annular cavity and the space in which pressure $P_2$ prevails, the tubular body further including a hole for connecting the annular cavity with the orifice.

7. A universal valve for use with a pneumatic device including an envelope forming an enclosed space and an orifice located in the envelope allowing passage between the enclosed space and an outside of the pneumatic device, the universal valve comprising:

a tubular body fixed on an internal face of the envelope in the enclosed space including a hole formed opposite the orifice to provide communication between the orifice and an internal recess formed in the tubular body, the internal recess having a frustoconical shape a cross section of which is smaller proximate the internal face and larger distal the internal face;

a deformable flexible member including a cover aligned along an axis of the orifice the cover having a core with a cross section less than that of the internal recess of the tubular body, a first dish portion proximate the internal face, a diameter of which is substantially equal to a diameter of a base of the tubular body, a second dish portion opposite the first dish portion connected to a skirt of the tubular body; and an annular cavity formed between the core and a frustoconical wall of the tubular body, the cavity communicating with the enclosed space; and wherein a pressure of the enclosed space is capable of being raised above an atmospheric pressure prevailing on the outside of the envelope, the deformable flexible member being deformable by differences in the pressures of the enclosed space and of the outside of the envelope to selectively allow passage of a fluid into or out of the envelope.

* * * * *

UNITED STATES PATENT AND TRADEMARK OFFICE
CERTIFICATE OF CORRECTION

PATENT NO. : 6,357,468 B1
DATED : March 19, 2002
INVENTOR(S) : Jean Roussel

It is certified that error appears in the above-identified patent and that said Letters Patent is hereby corrected as shown below:

Title page,
Item [56], References Cited, FOREIGN PATENT DOCUMENTS, insert
-- FR 823498 -- 1/1938 --
Item [57], ABSTRACT,
Line 2, after "an" delete "office [(0)]" and insert therefor -- orifice --
Line 2, after "wall" delete "[(P)]"
Line 3, after "body" delete "[(10)]" and after "cover" delete "[(11)]"
Line 4, after "pressures" delete "[($P_1$ and $P_2$)]"

Signed and Sealed this

Second Day of August, 2005

JON W. DUDAS
*Director of the United States Patent and Trademark Office*